(12) United States Patent
Troyer et al.

(10) Patent No.: US 9,412,074 B2
(45) Date of Patent: Aug. 9, 2016

(54) OPTIMIZED TROTTERIZATION VIA MULTI-RESOLUTION ANALYSIS

(71) Applicant: Microsoft Corporation, Redmond, WA (US)

(72) Inventors: Matthias Troyer, Zurich (CH); David B. Wecker, Redmond, WA (US); Bryan Clark, Santa Barbara, CA (US); Burton J. Smith, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 362 days.

(21) Appl. No.: 13/930,248

(22) Filed: Jun. 28, 2013

(65) Prior Publication Data

US 2015/0006597 A1   Jan. 1, 2015

(51) Int. Cl.
    *G06N 99/00*   (2010.01)
(52) U.S. Cl.
    CPC .................... *G06N 99/002* (2013.01)
(58) Field of Classification Search
    CPC .................................................. G06N 99/002
    See application file for complete search history.

(56) References Cited

U.S. PATENT DOCUMENTS

| | | | |
|---|---|---|---|
| 6,456,994 B1 * | 9/2002 | Tucci | 706/52 |
| 7,353,148 B1 | 4/2008 | Meyers et al. | |
| 2006/0123363 A1 * | 6/2006 | Williams et al. | 716/1 |
| 2008/0313430 A1 | 12/2008 | Bunyk | |
| 2009/0182542 A9 | 7/2009 | Hilton et al. | |
| 2011/0138344 A1 * | 6/2011 | Ahn | 716/104 |
| 2012/0177385 A1 * | 7/2012 | Guha | 398/202 |
| 2014/0192388 A1 * | 7/2014 | Miller et al. | 359/3 |

OTHER PUBLICATIONS

Brown et al., "Using Quantum Computers for Quantum Simulation," *Entropy*, 12:2268-2307 (2010).
Han, "Quantum Computation," pp. 1-89, Retrieved on Jan. 2, 2013 from http://lqcc.ustc.edu.cn/news/path/zwzhou/kecheng/quantumcomputing%20lecture1.pdf.
Kernan et al., "Trotter-Based Simulation of Quantum-Classical Dynamics," J. Phys. Chem. B, 112:424-432 (2008).
"Simulated Quantum Annealing," 4 pp., Retrieved on Jan. 2, 2013 from http://quantum.cs.washington.edu/wiki/uploads/e/e6/QuantumAnnealing-GroupMeetingPrint.pdf.
Svore et al., "A Layered Software Architecture for Quantum Computing Design Tools," *IEEE Computer Society*, pp. 58-67 (Jan. 2006).
Yung et al., "Introduction to Quantum Algorithms for Physics and Chemistry," pp. 1-45 (Jan. 2012).

* cited by examiner

*Primary Examiner* — Chuong D Ngo
(74) *Attorney, Agent, or Firm* — Steve Wight; Sandy Swain; Micky Minhas

(57) ABSTRACT

Operators such as unitary operators common in quantum mechanical applications may be approximated by a Trotter-like approximation. An operator may be decomposed and terms of the operator may be grouped, or assigned into levels. The levels may be scaled and applied at unique intervals of calculational steps. A quantum device may have circuitry for applying levels of the operator at the unique intervals.

18 Claims, 10 Drawing Sheets

300

302  $(U'_{(APPLIED)})^N \approx U_{(ACTUAL)}$   $A = \begin{pmatrix} a_{1,1} & a_{1,2} & \cdots & a_{1,n} \\ a_{2,1} & a_{2,2} & \cdots & a_{2,n} \\ & & \ddots & \\ a_{m,1} & a_{m,2} & \cdots & a_{m,n} \end{pmatrix}$ $U_{(ACTUAL)} = \exp(iA)$ 304  $A' = \begin{pmatrix} a'_{1,1} & a'_{1,2} & \cdots & 0 \\ a'_{2,1} & a'_{2,2} & \cdots & a'_{2,n} \\ & & \ddots & \\ 0 & a'_{m,2} & \cdots & a'_{m,n} \end{pmatrix}$   $a'_{i,j} = a_{i,j}/N$

306

$A'_1 = \begin{pmatrix} a'_{1,1} & a'_{1,2} & \cdots & 0 \\ 0 & a'_{2,2} & \cdots & 0 \\ & & \ddots & \\ 0 & 0 & \cdots & 0 \end{pmatrix}$   $A'_2 = \begin{pmatrix} 0 & 0 & \cdots & 0 \\ a'_{2,1} & 0 & \cdots & 0 \\ & & \ddots & \\ 0 & 0 & \cdots & a'_{m,n} \end{pmatrix}$ $A'_3 = \begin{pmatrix} 0 & 0 & \cdots & 0 \\ 0 & 0 & \cdots & a'_{2,n} \\ & & \ddots & \\ 0 & 0 & \cdots & 0 \end{pmatrix}$   $A'_4 = \begin{pmatrix} 0 & 0 & \cdots & 0 \\ 0 & 0 & \cdots & 0 \\ & & \ddots & \\ 0 & a'_{m,2} & \cdots & 0 \end{pmatrix}$

308  $B_1 = A'_1$   $B_2 = 2A'_2$   $B_3 = 3A'_3$   $B_4 = 4A'_4$

310  $u'_1 = \exp(iB_1)$   $u'_3 = \exp(iB_3)$ $u'_2 = \exp(iB_2)$   $u'_4 = \exp(iB_4)$

FIG. 3

OPTIMIZED TROTTERIZATION VIA MULTI-RESOLUTION ANALYSIS

BACKGROUND

Quantum computers and quantum algorithms promise computational speed-ups over their classical counterparts. Quantum computers and algorithms may be used in areas such as, but not limited to, quantum chemistry, quantum field theory, Shor's algorithm for prime factorization, and algorithms for quantum sampling.

However, what is needed are improved quantum computers and quantum algorithms to deliver the promised computational speed-ups.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

FIG. 3 is a flow diagram finding levels of partial approximate unitary operators.

DETAILED DESCRIPTION

Overview

This disclosure describes techniques for performing quantum calculations. In particular, techniques are described for improving the calculation of unitary operators (U) having exponential form, i.e., U=, where H is an operator, e.g., a Hermitian operator.

This disclosure also describes quantum systems for estimating unitary operators. In particular, the quantum systems may include sub-circuits (or levels of sub-circuits) that may be implemented at different or selectable times, e.g., level 1 sub-circuits may be implemented all the time, level 2 sub-circuits may be implemented at some times but not other times, etc. The corresponding quantum circuit provides lower depth and gate counts than previous quantum circuits.

The process and systems described herein may be implemented in a number of ways. Example implementations are provided below with reference to the following figures.

Illustrative Procedure

Figure 1:
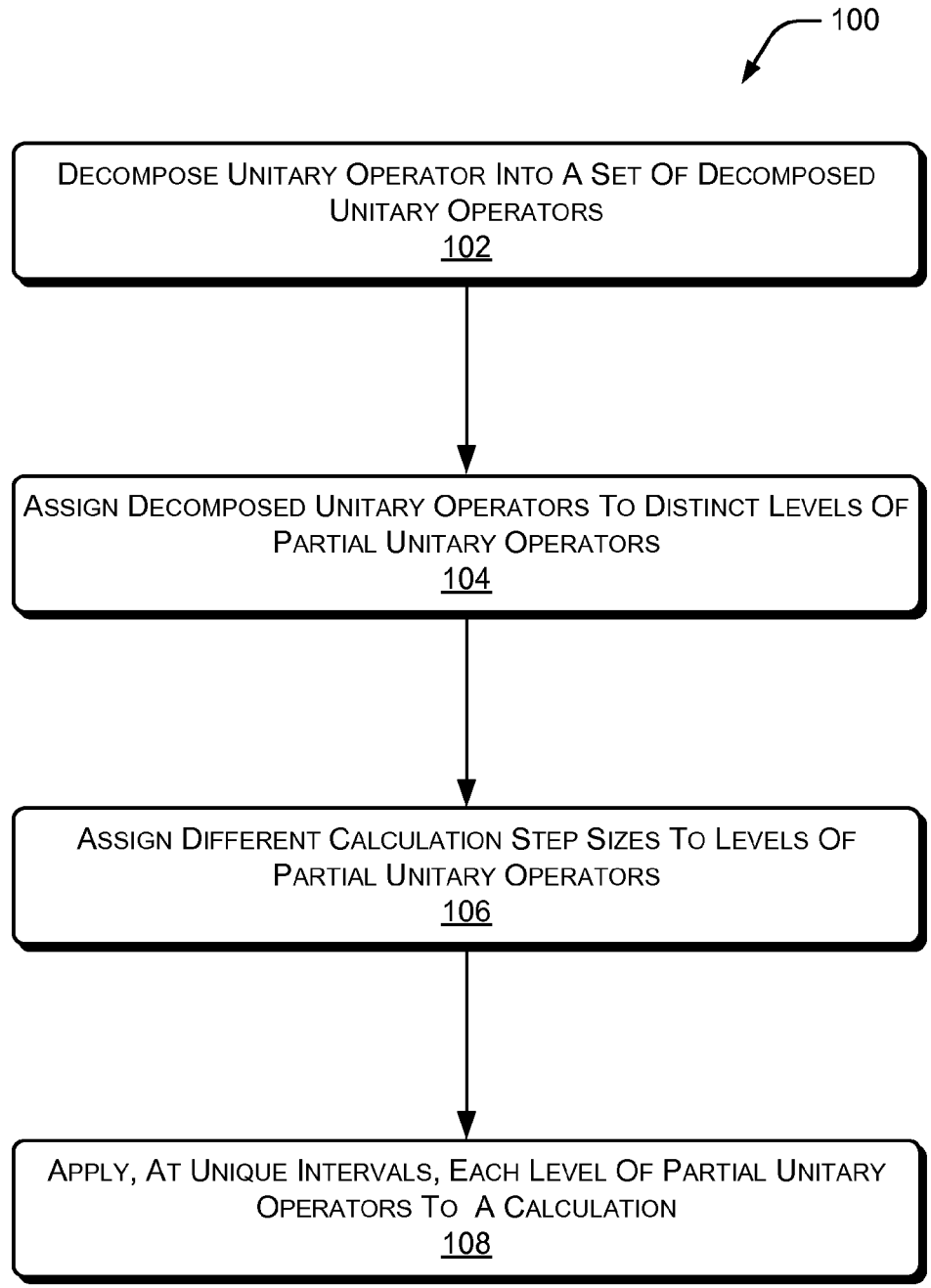
FIG. 1 is a flow diagram of an illustrative process for applying a unitary operator to a state.

FIG. 1 is a flow diagram of an illustrative process 100 for applying a unitary operator to a state, e.g., a qubit. The process 100 and other processes discussed hereinbelow are, or may be, illustrated as a collection of blocks in a logical flow graph, which represent a sequence of operations that can be implemented in hardware such as, but not limited to, non-quantum computing devices (e.g., digital computers), quantum devices (e.g., quantum computing systems) and/or a combination thereof, software/algorithms for non-quantum computing devices and/or quantum devices, or a combination hardware and software/algorithm(s). In the context of software/algorithms, the blocks represent computer-executable instructions that, when executed by one or more processors, cause the one or more processors to perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process(es).

At 102, a unitary operator (U) is decomposed into a set of decomposed unitary operators (U={$u_1, u_2, \ldots u_n$}), where $u_j$ represents a decomposed unitary operator.

At 104, decomposed unitary operators ($u_j$) are assigned to elements, or levels, of a set of partial unitary operators, e.g., $U_1=\{u_1, \ldots u_j, \ldots u_n\}$, $U_2=\{u_2, \ldots u_k, \ldots u_m\}$, etc., where $U_j$ represents partial unitary operator level j. The unitary operator (U) may be represented by the set of partial unitary operators, i.e., $U=\{U_1, U_2, \ldots U_T\}$. The number of levels and the size of each level may be predetermined.

At 106, different calculational step sizes are assigned to each level of partial unitary operators. As one non-limiting example, a calculational step size of 1 may be assigned to the partial unitary operator level 1 ($U_1$), a calculational step size of 2 may be applied to the partial unitary operator level 2 ($U_2$), and a calculational step size of 3 may be applied to the partial unitary operator level 3 ($U_3$). As another non-limiting example, a calculational step size of 1 may be assigned to the partial unitary operator level 1 ($U_1$), a calculational step size of 2 may be applied to the partial unitary operator level 2 ($U_2$), and a calculational step size of 4 may be applied to the partial unitary operator level 3 ($U_3$). Let $\Delta calc_l$ denote the calculational step size assigned to partial unitary operator level l.

At 108, a calculation is performed utilizing the levels of partial unitary operators, where different levels of partial unitary operators are applied at unique intervals, and where the interval at which a partial unitary operator level ($U_j$) is applied corresponds to the calculational step size assigned to that partial unitary operator level ($U_j$). For example, if $\Delta calc_1=1$, $\Delta calc_2=2$, and $\Delta calc_3=3$, then the partial unitary operator level 1 ($U_1$), the partial unitary operator level 2 ($U_2$), and the partial unitary operator level 3 ($U_3$) are applied at intervals of 1, 2 and 3, respectively. During the calculation, the partial unitary operators are applied to a state or a qubit a number of times ($M_{calc}$), and at the end of the calculation, the state or the qubit is approximately equivalent to $N_{applied}$ applications of the unitary operator (U) to the initial state or qubit.

Figure 2:
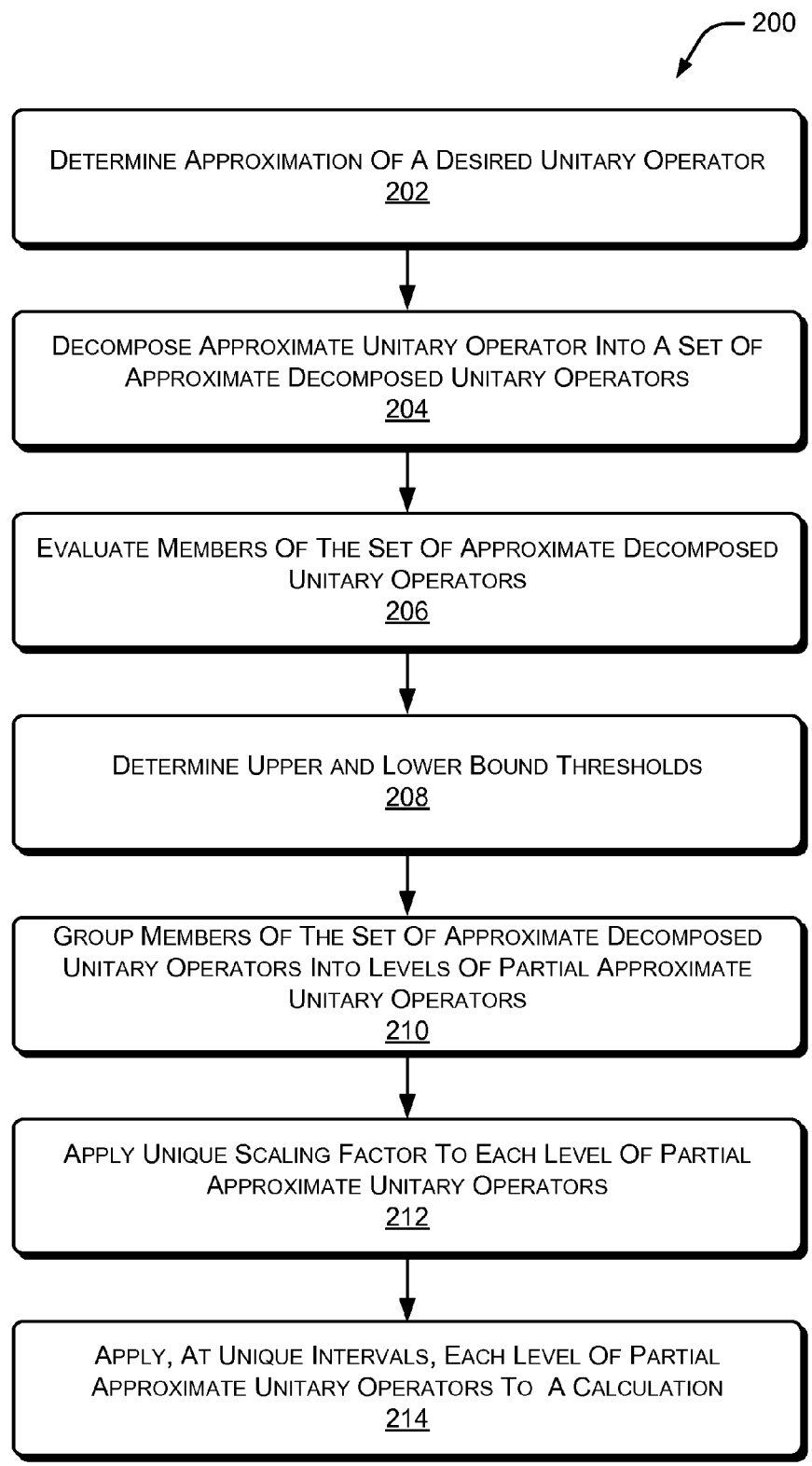
FIG. 2 is a flow diagram of another illustrative process for applying a unitary operator to a state.

FIG. 2 is a flow diagram of another illustrative process 200 for applying a unitary operator to a state, e.g., a qubit.

At 202, an approximation (U') of a desired or actual unitary operator (U) is determined. The desired unitary operator (U) may take the form of an exponential operator, i.e., $U=e^{iH}$, where H is a unitary operator and may be referred to herein as an exponent operator.

It should be noted that in many quantum mechanical applications the exponent operator, H, is frequently a linear combination of other operators, e.g., $H=\Sigma_{j=1}^{T} A_j$, and that these other operators may not commute, e.g., $[A_j, A_k]\psi \neq 0$. However, when the exponent operator, H, is a linear combination of other operators that do commute, $[A_j, A_k]\psi=0$, then the desired unitary operator (U) may be expressed as $U=e^{iH}=\Pi_{j=1}^T e^{iA_j}$.

In some instances, the desired unitary operator (U) may be approximated with a Trotter-like approximation. (It should be understood that techniques described herein for approximating the desired unitary operator are similar to, but not the same as, a Trotter approximation.) For example, for a first-order Trotter-like approximation, the desired unitary operator (U) may be approximated with first order Trotter terms, e.g., $$U \cong (e^{iH/N})^N = (e^{iH'})^N, \quad (1)$$

where N, which may be referred to as a "Trotter number," is an integer having a value that is chosen to provide an error that is acceptably small, and where H'=H/N. It should be understood that in some instances higher order Trotter terms or Trotter-like terms may be included in the approximation of the desired unitary operator (U) and that the discussion herein of first order Trotter terms is provided for clarity and is non-limiting.

In the event that the exponent operator, e.g., H, is a linear combination of operators, e.g., $H=\Sigma_{j=1}^T A_j$, equation (1) can be written as $$U \cong \left(\prod_{j=1}^T e^{iA_j/N}\right)^N = \left(\prod_{j=1}^T e^{iA'_j}\right)^N, \quad (2)$$

where $A_j'=A_j/N$. The error in equations (1) and (2) decreases with increasing N.

At 204, the approximation of the unitary operator U is decomposed into a set of approximate decomposed unitary operators. For example, the approximate exponent operator, H', may be expressed in matrix form, and the elements of the matrix H' may comprise the set of approximate decomposed unitary operators.

At 206, the members of the set of approximate decomposed unitary operators are evaluated. For example when the approximate exponent operator, H', is expressed as a matrix, the matrix elements may be evaluated. In some instances, evaluation of the matrix elements may include determining a relative measure for the matrix elements and comparing the relative measures. For example, in some embodiments, the relative measure may be a magnitude (or absolute value) for each matrix element, and the comparison may determine which matrix element has the largest magnitude (or absolute value).

At 208, upper and lower bound thresholds are determined. In some embodiments, the lower bound threshold and/or the upper bound threshold may be related to the matrix representing the approximate exponent operator, H', and/or one or more matrix elements. In some embodiments, the lower bound threshold and/or the upper bound threshold may be based at least in part on the Trotter number (N). In some embodiments, the lower bound threshold and/or the upper bound threshold may be based at least in part on the relative measures of the matrix elements. For example, the upper bound threshold may be given as $$\text{Threshold}_{Upper\ Bound}=\max\|h_{i,j}'\|, \quad (3)$$

where $h_{i,j}'$ is an off-diagonal matrix element of the approximate exponent operator, H', and the lower bound threshold may be given as $$\text{Threshold}_{Lower\ Bound}=\max\|h_{i,j}'\|/N, \quad (4)$$

where $h_{i,j}'$ is an off-diagonal matrix element of the approximate exponent operator, H', and N is the Trotter number.

As another non-limiting example, the lower bound threshold and/or the upper bound threshold may be based at least in part on the determinant or norm of the exponent operator, H, or the approximate exponent operator, H'. In some instances, the lower bound threshold may be based at least in part on the Trotter number and the determinant or norm of the exponent operator, H, or the determinant or norm of the approximate exponent operator, H'.

At 210, the members of the set of approximate decomposed unitary operators are grouped into levels of a set of partial approximate unitary operators, which is represented as $\{u_1', u_2', \ldots u_m'\}$, where the index denotes level. The number of levels and the size of each level may be predetermined.

In cases where the approximate exponent operator, H', is represented as a matrix, matrix elements ($h_{i,j}'$) are grouped into partial matrices, $H_l'$, such that $H' \cong \Sigma_{k=1}^{Np} H_k'$, where Np is the number of partial matrices used to represent the matrix H'. In the following discussion, the index of a partial matrix, $H_l'$, may be referred to as a level. Thus, partial matrix, $H_1'$, is a level 1 partial matrix, and so on.

The matrix elements ($h_{i,j}'$) may be grouped into partial matrix levels, $H_l'$, based at least in part on the upper and lower bound thresholds. For example, the matrix element ($h_{i,j}'$) that have a relative measure (e.g., magnitude or absolute value) that is less than the lower bound threshold may be ignored, i.e., not assigned to any one of the partial matrices, $H_l'$. Similarly, the matrix elements ($h_{i,k}'$) that have a relative measure (e.g., magnitude or absolute value) that is greater than or equal to the upper bound threshold may be assigned to a particular partial matrix, e.g., partial matrix level 1, $H_1'$.

Levels of the partial approximate unitary operators are functions of the corresponding partial matrices, i.e., $u_l'=e^{iH'_l}$.

At 212, unique scaling factors ($\alpha_l$) are applied to each of the partial approximate unitary operator levels, e.g., $u_l'=e^{i\alpha_l H'_l}=e^{iH''_l}$, where $H_l''=\alpha_l H_l'$.

At 214, a calculation is performed utilizing the levels of partial approximate unitary operators, where different levels of partial approximate unitary operators are applied at unique intervals, and where the interval at which a partial approximate unitary operator level ($u_l'$ is applied corresponds to the scaling factor ($\alpha_l$) for that partial approximate unitary operator level ($u_l'$). For example, if $\alpha_1=1$, $\alpha_2=2$, and $\alpha_3=3$, then the partial approximate unitary operator level 1 ($u_1'$), the partial approximate unitary operator level 2 ($u_2'$), and the partial approximate unitary operator level 3 ($u_3'$) are applied at intervals of 1, 2 and 3, respectively. During the calculation, the partial approximate unitary operators are applied to a state or a qubit a number of times ($M_{calc}$), and at the end of the calculation, the state or the qubit is approximately equivalent to $N_{applied}$ applications of the unitary operator (U) to the initial state or qubit.

FIG. 3 is a flow diagram of an illustrative process 300 for finding levels of partial approximate unitary operators.

At 302, an approximation ($U_{applied}'$) of a desired or actual unitary operator ($U_{actual}$) is determined, where N applications of the approximate unitary operator ($U_{applied}'$) is estimated to be approximately the same as a single application of the actual unitary operator ($U_{actual}$) and where N may be referred to as the "Trotter number." The actual unitary operator ($U_{actual}$) is an exponential operator, i.e., $U_{actual}=e^{iA}$, where A is an exponent operator that may be written in matrix form.

At 304, an approximation (A') of the exponent operator (A) is determined. Let A'=A/N, i.e., $a_{i,j}'=a_{i,j}/N$, and set the matrix elements $a_{i,j}'$ that have a relative measure lower than a lower bound threshold to zero. For example, matrix element $a_{1,2}$ may have the largest magnitude of all of the off-diagonal matrix elements, and the lower bound threshold may be set to a fraction of the largest magnitude, e.g., the quotient of the magnitude of $a_{1,2}/N$, where N is the Trotter number or $a_{1,2}/x$, where x is a predetermined number. In this example, the magnitude of $a_{m,1}$ is less than the lower bound threshold, so $a_{m,1}'=0$.

At 306, levels of partial matrices, $A_l'$, for the approximate matrix A' are formed such that $A' \cong \Sum_{k=1}^{Np} A_k'$, where Np is the number of partial matrices used to represent the approximate matrix A'. In the event that none of the matrix elements $a_{i,j}'$ were set to zero for having a relative measure lower than the lower bound threshold, then $A'=\Sum_{k=1}^{Np} A_k'$.

At 308, the levels of partial matrices, $A_l'$, are scaled by the appropriate level scaling factor ($\alpha_l$). Let $B_l=\alpha_l A_l'$. In this example, there are four levels, and $\alpha_1=1$, $\alpha_2=2$, $\alpha_3=3$, and $\alpha_4=4$.

At 310, levels of the partial approximate unitary operators ($u_l'$) are set to be exponential functions of the scaled levels of partial matrices, $A_l'$, i.e., $u_l'=e^{i\alpha_l A_l'}=e^{iB_l}$.

Exemplary pseudo code for forming partial matrices and levels of partial approximate unitary operators is as follows:

1. Determine matrix elements of approximate exponent operator A'.
2. Determine upper and lower bound thresholds. In some embodiments, the upper and lower bound thresholds may be determined by equations 3 and 4, respectively.
3. For each value $a_{i,j}'$:
   a. If $||a_{i,j}'|| \geq \text{Threshold}_{Upper\ Bound}$, then assign current matrix element $a_{i,j}'$ to level 1.
   b. Else If $||a_{i,j}'|| \leq \text{Threshold}_{Lower\ Bound}$, then ignore (or set to zero) the current matrix element $a_{i,j}'$
   c. Else
      i. Find GroupNum:
         GroupNum = 1 + int($\text{Threshold}_{Upper\ Bound}/||a_{i,j}'||$)
      ii. Scale current matrix element $a_{i,j}'$:
         $b_{i,j}'$ = GroupNum × $a_{i,j}'$
      iii. Assign current matrix element $a_{i,j}'$ to level:
         $b_{i,j}'$ assigned to $B_{GroupNum}$
      iv. Set partial approximate unitary operators:
         $u_l' = e^{iB_l}$.

Figure 4A:
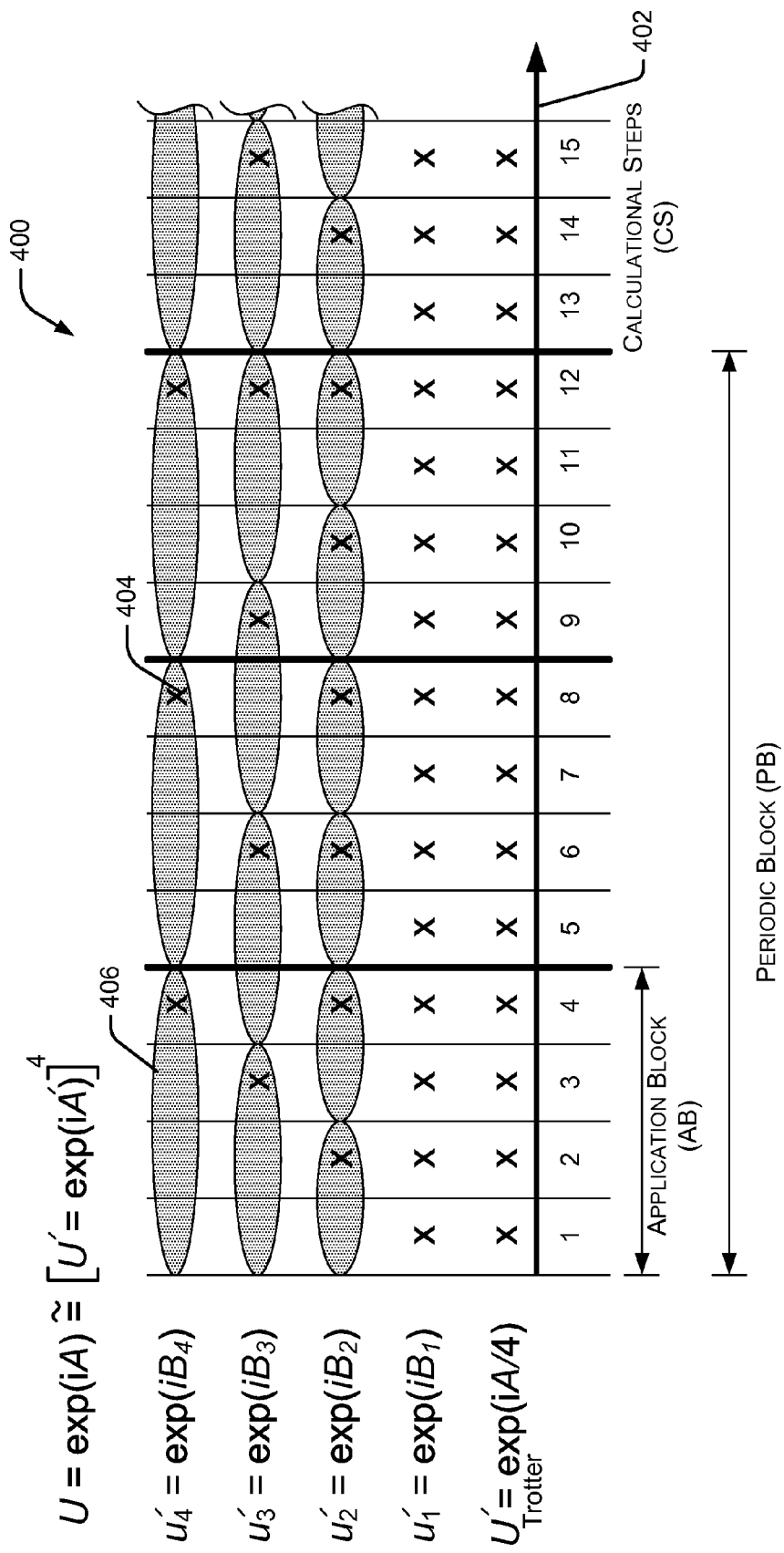
FIGS. 4A and 4B are illustrative sequence diagrams for the evolution of partial approximate unitary operators.

FIG. 4A is an example sequence diagram 400 for the evolution of partial approximate unitary operators. In this example, the Trotter number (N) is four and the number of levels is also 4. This is a non-limiting example, and in other instances, the Trotter number (N) and the number of levels are different.

The horizontal line 402 is in units of calculational steps (CS), i.e., the step size for evolving the approximate unitary operator (U') in a computing device. Instances of operator evolution are denoted by X's 404, and ovals 406 denote the number of multiple calculational steps for a corresponding instance of operator evolution.

In many calculations, there may be multiple applications of the desired/actual unitary operator (U), and the sequence diagram 400 shows the calculational steps for several applications of the desired/actual unitary operator (U).

If one were to approximate the actual/desired unitary operator ($U=e^{iA}$) with a first order Trotter approximation with a Trotter number of 4, i.e., $U \cong [e^{iA/4}]^4$, then the quantity $e^{iA/4}$ would evolve at every calculational step. (The quantity $e^{iA/4}$ is referred to herein as the first order Trotter approximation and is denoted by $U_{Trotter}'$, i.e., $U_{Trotter}'=e^{iA/4}$.) An "application block" denotes the number of calculational steps for which the first order Trotter approximation is approximately equivalent to a single application of the actual/desired unitary operator (U) and is equal to the Trotter number.

Utilizing the levels of partial approximate unitary operators ($u_1'$, $u_2'$, $u_3'$, $u_4'$) can greatly improve the computational efficiency.

In this example, the level 1 partial approximate unitary operator ($u_1'$) is evolved at every calculational step. However, the number of matrix elements (or the number of non-zero matrix elements) in $B_1$ is less than the number of matrix elements (or non-zero matrix elements) in A. Thus, it is computationally easier and faster to calculate evolutions of the level 1 partial approximate unitary operator ($u_1'$) rather than the Trotter approximation ($U_{Trotter}'$).

The level 2 partial approximate unitary operator ($u_2'$) is evolved every other calculational step. Similarly, the level 3 partial approximate unitary operator ($u_3'$) and the level 4 partial approximate unitary operator ($u_4'$) are evolved every third and fourth calculational steps, respectively. It should be remembered that the matrix elements of $B_2$, $B_3$ and $B_4$ have been scaled accordingly (i.e., for elements of $B_2$, $b_{i,j}=2a_{i,j}/4$, for elements of $B_3$, $b_{i,j}=3a_{i,j}/4$, and for elements of $B_4$, $b_{i,j}=4a_{i,j}/4$) to account for their being evolved less frequently. The number of matrix elements (or the number of non-zero matrix elements) in $B_2$, $B_3$ and $B_4$ is less than the number of matrix elements (or non-zero matrix elements) in A. Thus, it is computationally easier and faster to calculate applications of the level 2, 3 and 4 partial approximate unitary operators ($u_2'$, $u_3'$, $u_4'$) rather than the Trotter approximation ($U_{Trotter}'$) due in part to number of matrix elements (or the number of non-zero matrix elements) in $B_2$, $B_3$ and $B_4$ and due in part to the level 2, 3 and 4 partial approximate unitary operators ($u_2'$, $u_3'$, $u_4'$) being evolved every 2, 3, and 4 calculational step, respectively, rather than every step.

It should be noted that for the first application block, i.e., calculational steps 1-4, the level 3 partial approximate unitary operator ($u_3'$) is under represented. However after twelve calculational steps, all partial approximate unitary operator levels are properly represented.

In this example, 12 calculational steps are a periodic block (i.e., at every multiple of 12 calculational steps, all partial approximate unitary operator levels are properly represented and the sequence of applications of the partial approximate unitary operator levels repeats). More generally, a periodic block is the lowest common multiple of the scaling factors of the levels ($\alpha_l$).

As discussed above, the desired/actual unitary operator (U) may, in some applications, be applied multiple times. Let M equal the number of times the desired/actual unitary operator (U) is applied. In which case, the total number of calculational steps, $N_{CS}^T$, for a calculation of M applications of the desired/actual unitary operator (U) is $N_{CS}^T=N \times M$, where N is the Trotter number. When the total number of calculational steps, $N_{CS}^T$, is an integer multiple of the Periodic Block, the calculational error is smaller than otherwise, because all of the partial approximate unitary operator levels are fully represented.

In some embodiments, the value of a partial approximate unitary operator level may be stored the first calculation step, or in some instances, in a subsequent calculational step, that the partial approximate unitary operator level is evolved. For example, for calculational step (CS) 1, the value of level 1 partial approximate unitary operator ($u_1'$) is stored; for CS 2, the value of level 2 partial approximate unitary operator ($u_2'$) is stored; for CS 3, the value of level 3 partial approximate unitary operator ($u_3'$) is stored; and so on. These stored values may then be used for applying the partial approximate unitary operators at higher calculational steps.

Figure 4B:
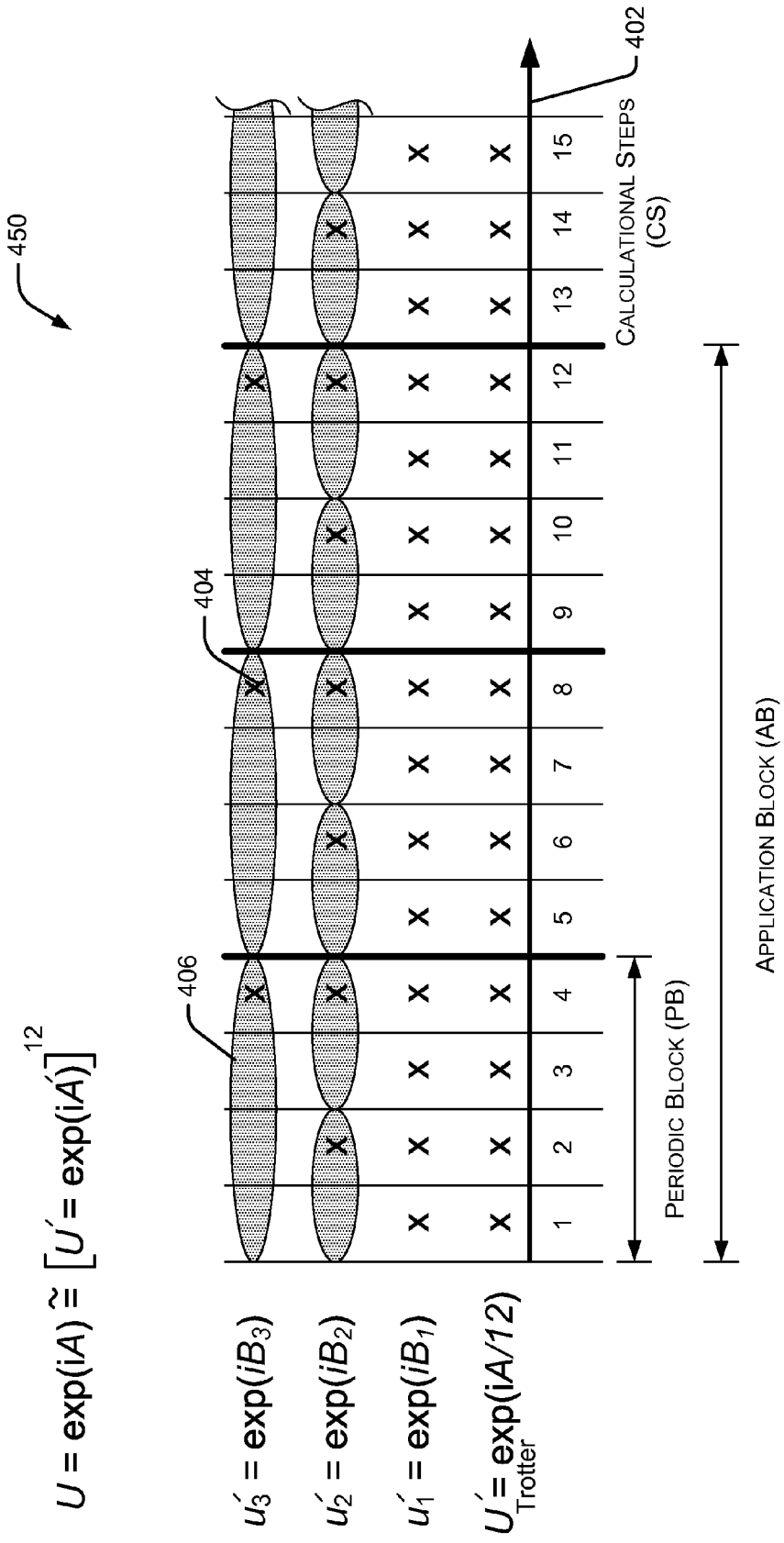

FIG. 4B is another example sequence diagram 450 for the evolution of partial approximate unitary operators. In this example, the Trotter number (N) is 12 and the number of levels is 3. The sequence diagram 450 shows the calculational steps for an application of the desired/actual unitary operator (U) and several subsequent calculational steps.

In this example, the levels of the partial approximate unitary operator, $u_1'$, $u_2'$, and $u_3'$ are scaled by 1, 2 and 4, respectively, such that the matrix elements of $B_2$, $B_3$ and $B_4$ are given by: (1) $b_{i,j}=1a_{i,j}/12$, (2) $b_{i,j}=2a_{i,j}/12$ and (3) $b_{i,j}=4a_{i,j}/12$, respectively.

Consequently, the level 1 partial approximate unitary operator ($u_1'$) is evolved at every calculational step; the level 2 partial approximate unitary operator ($u_2'$) is evolved every other calculational step; and the level 3 partial approximate unitary operator ($u_3'$) is evolved every fourth calculational step.

It should be remembered that the Trotter number (N) is selected such that the error in the approximation is sufficiently small and that the error in the approximation decreases with increasing N. The Trotter number (N) may be selected based in part on an acceptable error level, and, in some instance, may also be selected based in part on the selected Trotter number (N) being an integer multiple of the periodic block (e.g., N=m× Periodic Block, where m is an integer greater than 1) and/or the application block (e.g., N=m× application Block, where m is an integer greater than 1).

For example, assume that a Trotter number of 10 would have resulted in the error in a true Trotter approximation being sufficiently small, e.g., $\|U-[U_{Trotter}']^{10}\| \leq \epsilon$, where $\epsilon$ is the amount of acceptable error, where $U=e^{iA}$ and where $U_{Trotter}'=e^{iA/10}$. In such a situation, it would take 10 calculational steps of the true Trotter approximation ($U_{Trotter}'=e^{iA/10}$) to approximate one application of the actual unitary operator U.

However, at 10 calculational steps, the level 3 partial approximate unitary operator ($u_3'$) is under represented because the level 3 partial approximate unitary operator ($u_3'$) has only been applied at calculational steps 4 and 8. Thus, in this situation, the Trotter number (N) is selected to be 12, which is greater than 10 and is a multiple of the periodic block. Selecting the Trotter number (N) to be 12 means that none of the partial approximate unitary operator levels are under represented.

Illustrative Environment

Figure 5:
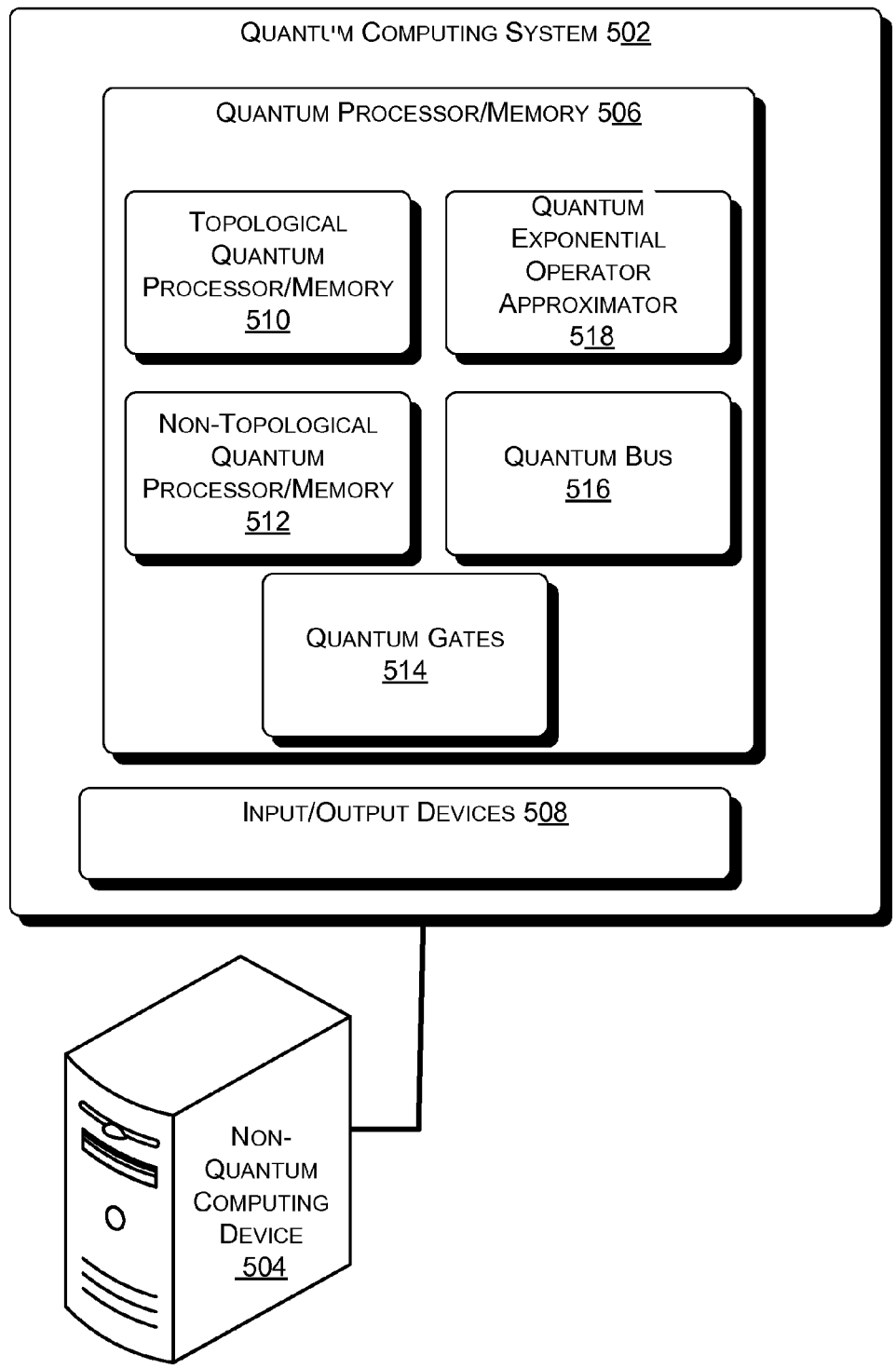
FIG. 5 is a schematic diagram of an illustrative environment 500 for performing quantum calculations.

FIG. 5 is a schematic diagram of an example environment 500 for performing quantum calculations. The environment 500 includes a quantum computing system 502 and a non-quantum computing device 504. The non-quantum computing device 504 may be a digital computing system.

The quantum computing system 502 may include a quantum processor/memory 506 and input/output devices 508. The input/output devices 508 may include interferometers and other devices for, among other things, reading and setting states of qubits in the quantum processor/memory 506 and may include devices for interfacing with the non-quantum computing device 504.

The quantum processor/memory 506 may include topological quantum processor/memory 510, non-topological quantum processor/memory 512, quantum gates 514, quantum bus 516, and quantum exponential operator approximator 518. The topological quantum processor/memory 510 may include devices and components for providing topological based quantum computing, e.g., 5/2 quantum Hall systems and systems exhibiting Majorana modes such as, but not limited to, 1-dimensional or quasi 1-dimensional wires. See U.S. patent application Ser. No. 13/860,246, filed Apr. 10, 2013, entitled "Multi-Band Topological Nanowires," which is incorporated by reference herein in its entirety, for details of an exemplary system exhibiting Majorana modes.

The non-topological quantum processor/memory 512 may include devices and components for providing non-topological based quantum computing. For example, the non-topological quantum processor/memory 512 may include Josephson junctions for providing flux qubits.

The quantum bus 516 may include devices and components for providing an interface between quantum processor/memory 506 and the input/output devices 508. The quantum bus 516 may include devices and components for providing an interface between the topological quantum processor/memory 510 and the non-topological quantum processor/memory 512. An example quantum bus is described in U.S. patent application Ser. No. 13/292,217, U.S. Patent Publication No. 20120112168, entitled "Coherent Quantum Information Transfer between Topological and Conventional Qubit," filed Nov. 9, 2011, which is incorporated by reference herein in its entirety.

The quantum gates 514 may include various devices and components for performing various operations on qubit states. For example, quantum gates 514 may include devices and components for, among others, Hadamard gates, phase gates, unitary gates, controlled gates (e.g., controlled unitary gates), adder gates, and corresponding adjoint adder gates.

The quantum exponential operator approximator 518 includes devices, components and circuits for approximating exponential unitary quantum operators.

Illustrative Quantum Exponential Operator Approximator

Figure 6:
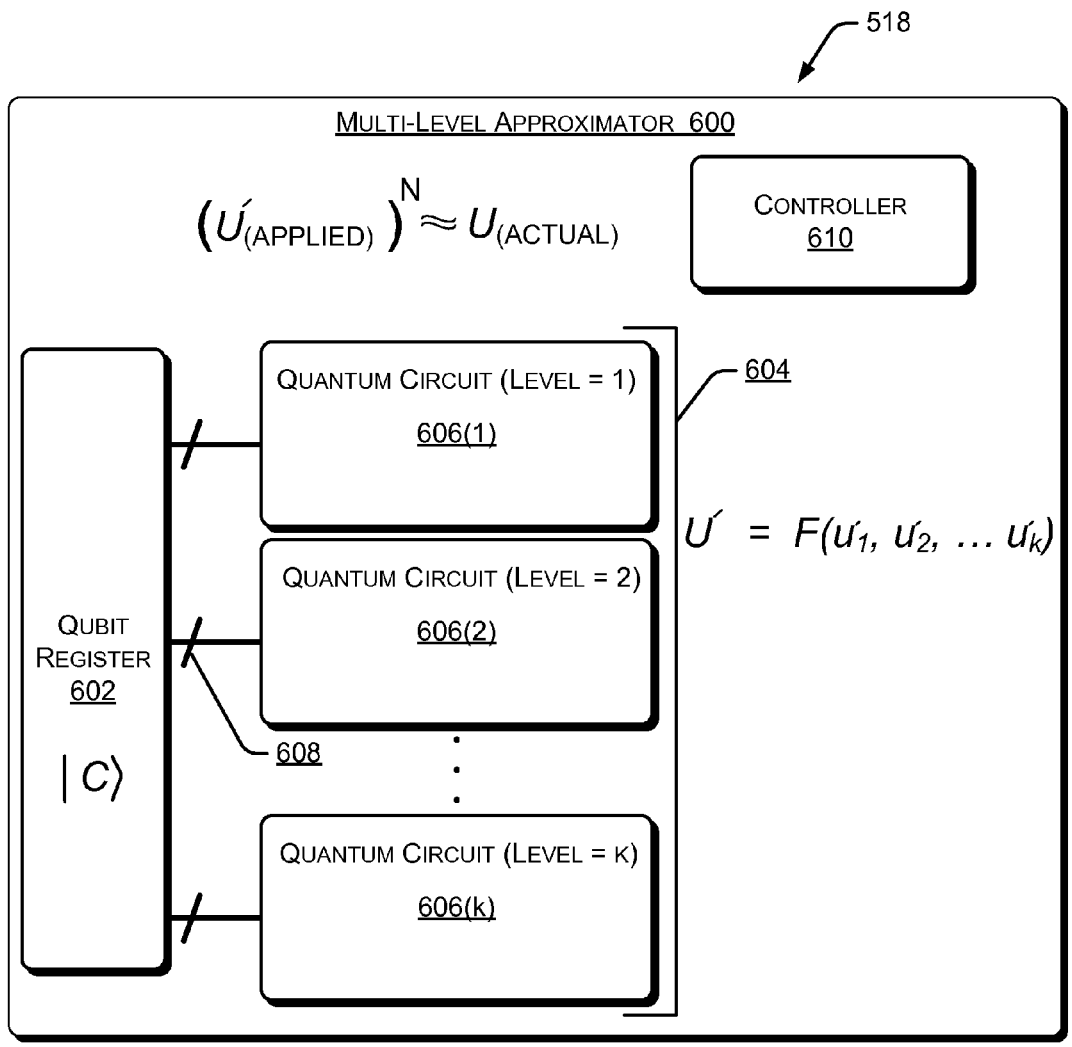
FIG. 6 is a schematic diagram of an illustrative quantum exponential operator approximator.

FIG. 6 shows a non-limiting embodiment of an example quantum exponential operator approximator 518. The operation of the quantum exponential operator approximator 518 are discussed hereinbelow in subsequent sections of this disclosure. In some embodiments, the quantum exponential operator approximator 518 may be comprised of quantum circuitry that may be generally static such that the quantum circuitry may provide a set function, calculation, etc. In other embodiments, the quantum exponential operator approximator 518 may be comprised of quantum circuitry that may be generally dynamic such that the quantum circuitry may be configured, programmed, arranged, etc. to provide variable functions, calculations, etc.

FIG. 6 is a schematic diagram of an example sequential quantum exponential operator approximator 518 that may be employed by the quantum processor/memory 506 of FIG. 5. The quantum exponential operator approximator 518 includes a multi-level approximator 600. The multi-level approximator 600 approximates an actual unitary operator having an exponential form, i.e., $U(actual)=e^{iH}$, where H is an exponent operator, with levels of an approximated unitary operator $[U'(applied)]^N \cong U(actual)$, where N is chosen to provide an error that is acceptably small. The approximated unitary operator U'(applied) has an exponential form, $U'(applied)=e^{iH/N}$.

The multi-level approximator 600 includes a qubit register 602 in which a calculational state $|C\rangle$, which is comprised of one or more qubits, resides and a multi-level quantum circuit array 604. The multi-level quantum circuit array 604 is comprised of k levels of quantum circuits, individually referenced as 606(1)-606(k) and collectively referenced as 606. The multi-level quantum circuit array 604 applies levels of the approximated unitary operator U'(applied) to the calculational state |C⟩. The levels of the approximated unitary operator U'(applied) are denoted by $u_i'$ and may correspond to the partial approximate unitary operators previously described. The k levels of quantum circuits 606 correspond to the levels of the approximated unitary operator U'(applied).

In some embodiments, quantum circuits 606 may be configured to apply multiple partial approximate unitary operators at one or more of the levels.

A "slash" 608 indicates that the calculational state |C⟩ 602 is comprised of multiple qubits and that there may be multiple connections, paths, wires, etc. between the qubit register 602 and the quantum circuits 606. Some or all of the levels of quantum circuits 606 may share at least one common connection, path, wire, etc. such the calculational state |C⟩ 602 is entangled via applications/evolution of the levels of quantum circuits 606.

The calculational state |C⟩ 602 may be, among other things, a quantum state employed in decryption (e.g., for prime factorization), quantum chemistry, and sorting.

In some embodiments, the multi-level approximator 600 may include a controller 610. The controller 610 may determine at which calculational steps to invoke the levels of quantum circuits 606 so as to apply/evolve the partial approximate unitary operators. In other embodiments, the controller 600 may be part of the topological quantum processor/memory 510 and/or the non-topological quantum processor/memory 512. In yet other embodiments, the non-quantum computing device 504 may provide control signals, for among other things, invoke the levels of quantum circuits 606 at various calculational steps.

Figure 7:
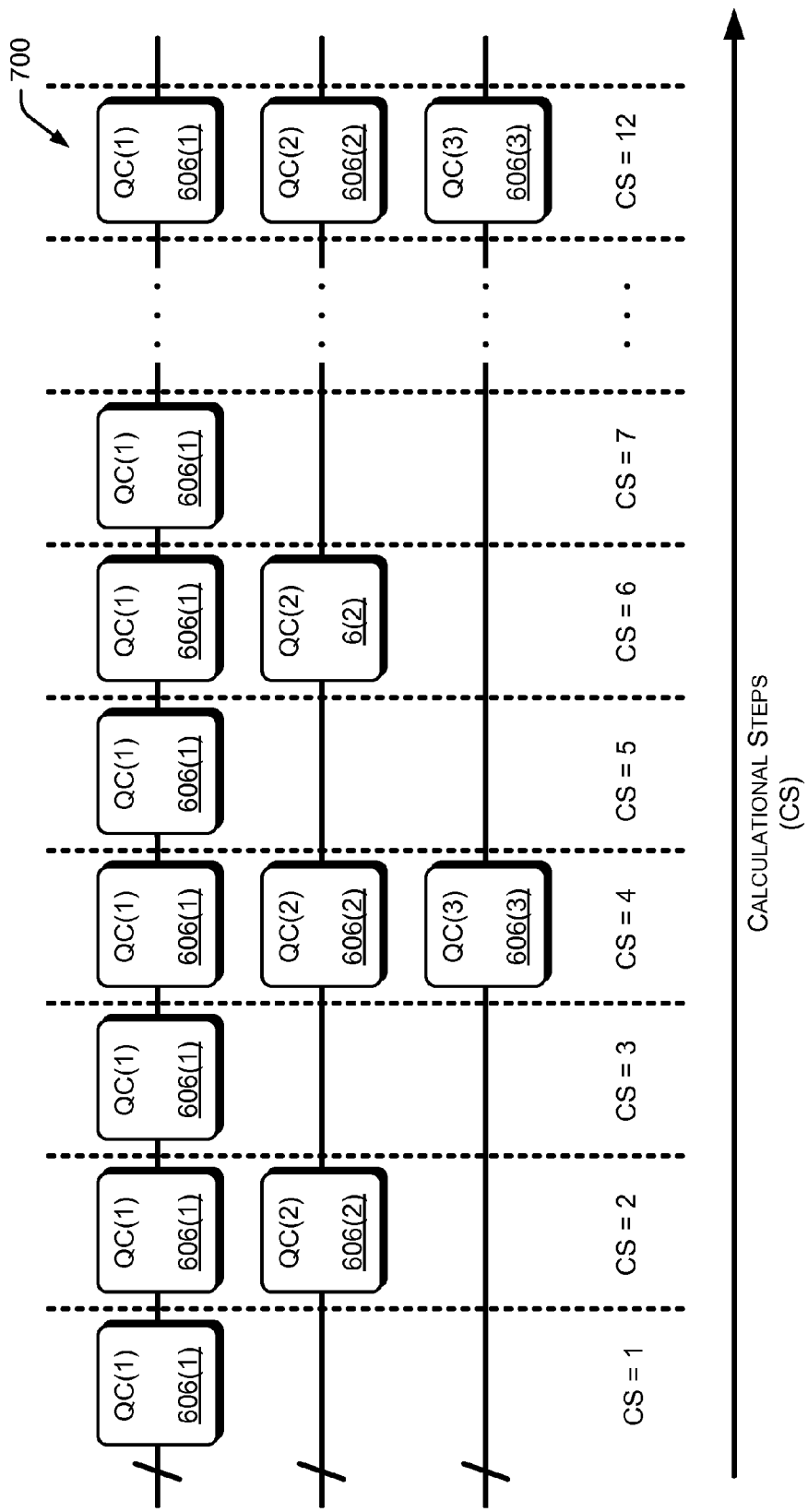
FIG. 7 is an illustrative sequence diagram for application of a multi-level approximator.

FIG. 7 is a sequence diagram 700 for application of the multi-level approximator 600. In this example, the Trotter number is 4, and the scaling factors for levels 1, 2 and 3 are 1, 2, and 4, respectively. The level 1 quantum circuit 606(1) is evolved at every calculational step; the level 2 quantum circuit 606(2) is evolved at every other calculational step; and the level 3 quantum circuit 606(4) is evolved at every fourth calculational step. In this example, the application block and the periodic block are both equal to 4 calculational steps.

Figure 8:
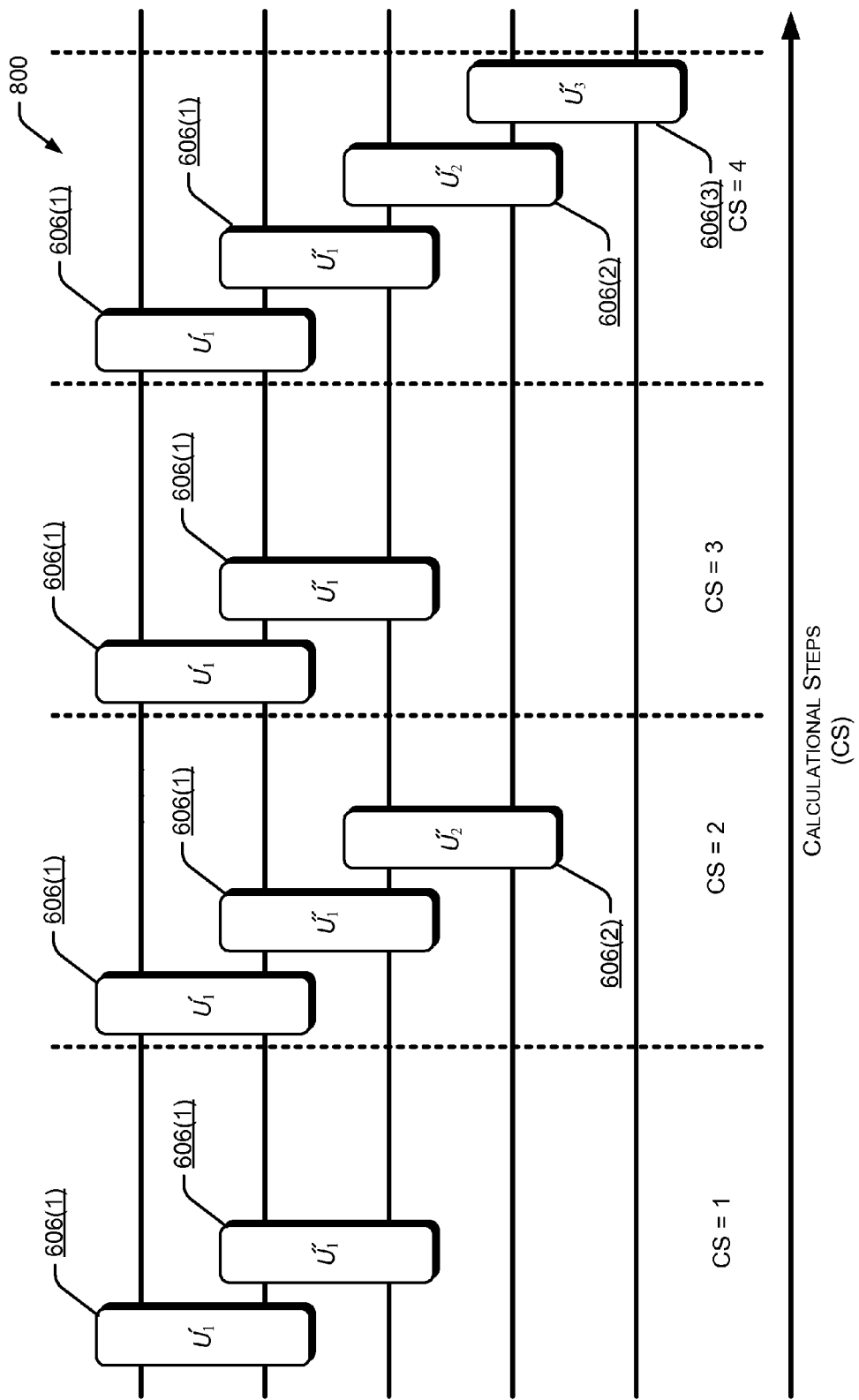
FIG. 8 is another illustrative sequence diagram for application of a multi-level approximator.

FIG. 8 is another sequence diagram 800 for application of the multi-level approximator 600. In this example, the Trotter number is 4, and the scaling factors for levels 1, 2 and 3 are 1, 2, and 4, respectively.

In this example, actual/desired unitary operator (U) involves two non-commuting operators (A and B). The A operator is approximated by a level 1 partial approximate unitary operator ($U_1'$), and the B operator is approximated by the level 1, level 2, and level 3 partial approximate unitary operators ($U_1''$, $U_2''$, $U_3''$), respectively.

The level 1 quantum circuit 606(1) is configured to apply/evolve level 1 partial approximate unitary operators ($U_1'$, $U_1''$) at every calculational step. The level 2 quantum circuit 606(2) is configured to apply/evolve level 2 partial approximate unitary operators ($U_2''$) at every other calculational step, and the level 3 quantum circuit 606(3) is configured to apply/evolve level 3 partial approximate unitary operators ($U_3''$) at every fourth calculational step.

Illustrative Non-Quantum Computing Device

Figure 9:
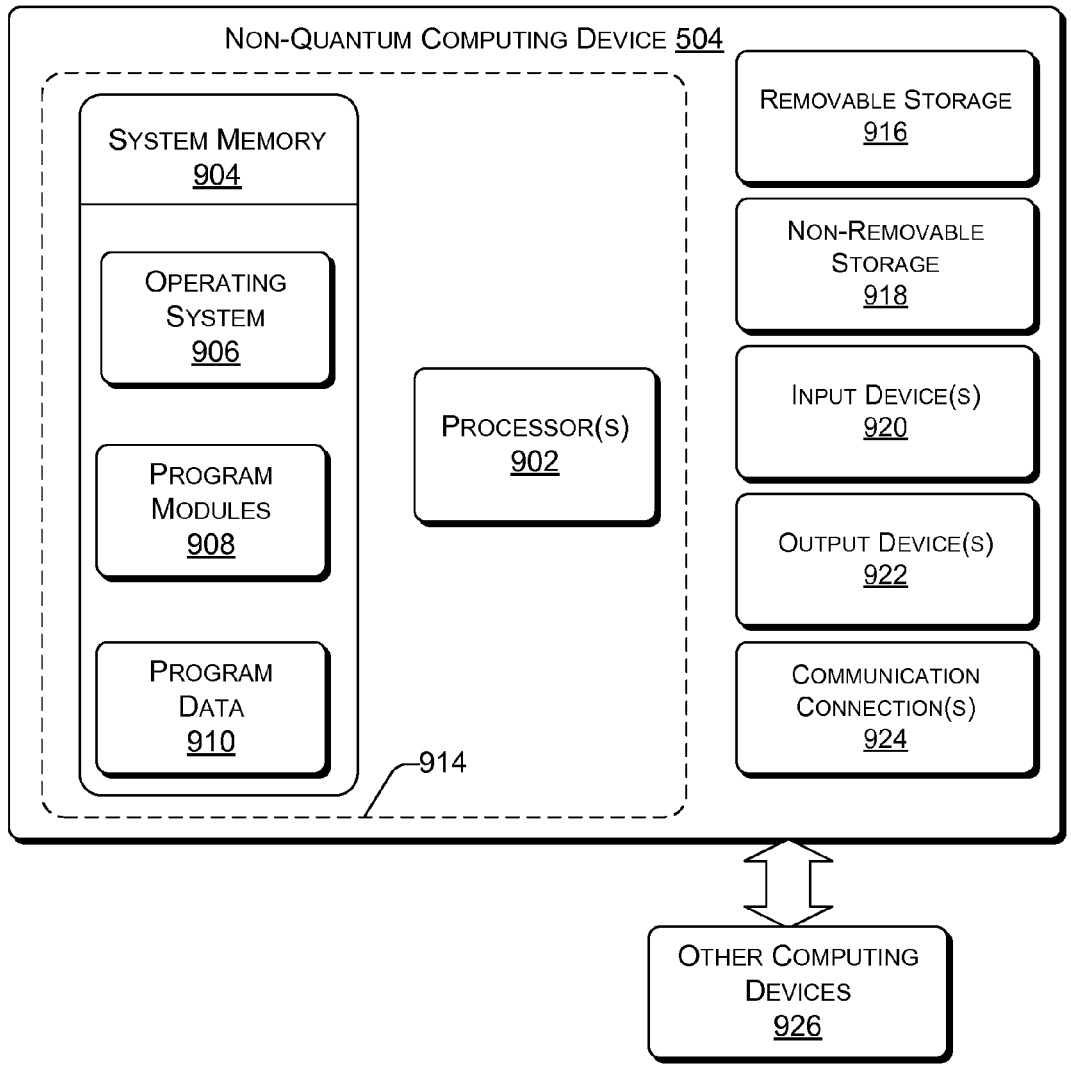
FIG. 9 is a schematic diagram of an illustrative non-quantum computing device for use in the environment for performing quantum calculations.

FIG. 9 shows an illustrative non-quantum computing device 504 that may be used in environment 500. It will readily be appreciated that the various embodiments described above may be implemented in other computing devices, systems, and environments. The non-quantum computing device 504 shown in FIG. 9 is only one example of a computing device and is not intended to suggest any limitation as to the scope of use or functionality of the computer and network architectures. The non-quantum computing device 504 is not intended to be interpreted as having any dependency or requirement relating to any one or combination of components illustrated in the example computing device.

In a very basic configuration, the non-quantum computing device 504 typically includes at least one processor 902 and system memory 904. The processor 902 is a non-quantum processing unit such as, for example, a conventional computer processor such as a digital processor. Depending on the exact configuration and type of computing device, the system memory 904 may be volatile (such as RAM), non-volatile (such as ROM, flash memory, etc.) or some combination of the two. The system memory 904 typically includes an operating system 906, one or more program modules 908, and may include program data 910. The computing device 900 is of a very basic configuration demarcated by a dashed line 914.

The program modules 908 may include instructions for, among other things, implementing simulations of quantum systems on the non-quantum computing device 504, providing control signals to the quantum computing system 502, and receiving data from the quantum computing system 502. In addition, the program modules 908 may include instructions for, implementing calculations utilizing levels of partial approximate unitary operators.

The non-quantum computing device 504 may have additional features or functionality. For example, the computing device 504 may also include additional data storage devices (removable and/or non-removable) such as, for example, magnetic disks, optical disks, or tape. Such additional storage is illustrated in FIG. 9 by removable storage 916 and non-removable storage 918. Computer-readable media may include, at least, two types of computer-readable media, namely computer storage media and communication media. Computer storage media may include volatile and non-volatile, removable, and non-removable media implemented in any method or technology for storage of information, such as computer readable instructions, data structures, program modules, or other data. The system memory 904, the removable storage 916 and the non-removable storage 918 are all examples of computer storage media. Computer storage media includes, but is not limited to, random-access-memory (RAM), read-only-memory (ROM), electrically erasable programmable ROM (EEPROM), flash memory or other memory technology, compact disk (CD), CD-ROM, digital versatile disks (DVD), or other optical storage, magnetic cassettes, magnetic tape, magnetic disk storage or other magnetic storage devices, or any other non-transmission medium that can be used to store the desired information and which can be accessed by the non-quantum computing device 504. Any such computer storage media may be part of the non-quantum computing device 504. Moreover, the computer-readable media may include computer-executable instructions that, when executed by the processor(s) 902, perform various functions and/or operations described herein.

In contrast, communication media embodies computer-readable instructions, data structures, program modules, or other data in a modulated data signal, such as a carrier wave, or other transmission mechanism. As defined herein, computer storage media does not include communication media.

The non-quantum computing device 504 may also have input device(s) 920 such as keyboard, mouse, pen, voice input device, touch input device, etc. Output device(s) 922 such as a display, speakers, printer, etc. may also be included. These devices are well known in the art and are not discussed at length here.

The non-quantum computing device 504 may also contain communication connections 924 that allow the device to communicate, such as over a network, with other computing devices 926 including the quantum computing system 502. These networks may include wired networks as well as wireless networks. The communication connections 924 are one example of communication media.

The illustrated non-quantum computing device 504 is only one example of a suitable device and is not intended to suggest any limitation as to the scope of use or functionality of the various embodiments described. Other well-known computing devices, systems, environments and/or configurations that may be suitable for use with the embodiments include, but are not limited to personal computers, server computers, handheld or laptop devices, multiprocessor systems, microprocessor-base systems, set top boxes, game consoles, programmable consumer electronics, network PCs, minicomputers, mainframe computers, distributed computing environments that include any of the above systems or devices, and/or the like.

CONCLUSION

The above-described techniques generally pertain to quantum devices, quantum algorithms, and simulations of quantum systems on non-quantum devices such as digital computers. Although the techniques have been described in language specific to structural features and/or methodological acts, it is to be understood that the appended claims are not necessarily limited to the specific features or acts described. Rather, the specific features and acts are disclosed as exemplary forms of implementing such techniques.

What is claimed is:

1. A method of performing a quantum calculation, comprising:
    generating at least one level of partial unitary operators;
    assigning unique scaling factors to each level of partial unitary operators;
    evolving, at unique intervals of calculational steps, each level of partial unitary operators;
    constructing quantum circuits based on each level of partial unitary operators; and
    with the constructed quantum circuits, applying each evolved level of partial unitary operators to a calculational state comprised of multiple qubits.

2. The method of claim 1, wherein generating at least one level of partial unitary operators comprises:
    determining a relative measure for a plurality of matrix element of a matrix; and
    assigning the matrix elements to a level of partial unitary operators based at least in part on the determined relative measures.

3. The method of claim 2, wherein determining the relative measure for the plurality of matrix element of a matrix comprises:
    determining a magnitude or an absolute value of each matrix element.

4. The method of claim 3, wherein assigning the matrix elements to a level of partial unitary operators based at least in part on the determined relative measures comprises:
    determining a number of levels, wherein each level corresponds to a range of relative measures; and
    assigning a respective matrix element to a corresponding level of partial unitary operators in response to the relative measure of the respective matrix element being in the range of relative measures for the corresponding level.

5. The method of claim 3, wherein assigning the matrix elements to a level of partial unitary operators based at least in part on the determined relative measures comprises:
    determining whether the relative measure of a respective matrix element is less than a lower bound threshold; and
    not assigning the respective matrix element to any level of partial unitary operators in response to the relative measure of the respective matrix element being less than the lower bound threshold.

6. The method of claim 3, wherein assigning the matrix elements to a level of partial unitary operators based at least in part on the determined relative measures comprises:
    determining whether the relative measure of a respective matrix element is greater than an upper bound threshold; and
    assigning the respective matrix element to a first level of partial unitary operators in response to the relative measure of the respective matrix element being greater than the upper bound threshold, wherein the first level of partial unitary operators are evolved at every calculational step.

7. The method of claim 6, wherein no other level of partial unitary operators are evolved at every calculational step.

8. The method of claim 1, wherein each level of partial unitary operators is comprised of a number of matrix elements, and wherein assigning unique scaling factors to each level of partial unitary operators comprises:
    for each level of partial unitary operators, multiplying the matrix elements of the respective level of partial unitary operators with the corresponding scaling factor.

9. The method of claim 1, wherein for each level of partial unitary operators, the corresponding unique interval of calculational steps and the corresponding scaling factor are the same.

10. The method of claim 1, further comprising:
    employing the calculational state in encryption of data.

11. The method of claim 1, further comprising:
    employing the calculational state in decryption of data.

12. A quantum computing device, comprising:
    a qubit register having a state comprised of multiple qubits; and
    a quantum circuit array comprised of multiple levels of quantum circuits, each level of quantum circuits configured to apply a corresponding level of partial unitary operators, wherein each level is associated with a different interval of calculational steps and for each level of quantum circuits, the corresponding level of partial unitary operators is comprised of matrix elements, and wherein the matrix elements for each level of quantum circuits are assigned thereto based at least in part on a corresponding relative measure of each of the matrix elements.

13. The quantum computing device of claim 12, further comprising:
    a controller configured to invoke the levels of quantum circuits.

14. The quantum computing device of claim 12, wherein the quantum computing device is configured to receive control signals from a remote device for invoking the levels of quantum circuits.

15. The quantum computing device of claim 12, wherein the levels of partial unitary operators are unique.

16. The quantum computing device of claim 12, wherein for a given level of partial quantum circuits, the relative measures of the corresponding matrix elements are within a predetermined range of values.

17. A method of performing a quantum calculation, comprising:

determining a relative measure for a plurality of matrix elements of a matrix;

assigning each matrix element to a respective level of partial unitary operators based at least in part on the respective relative measure of the matrix element;

applying a scaling factor to each matrix element assigned to a respective level of partial unitary operators, wherein the scaling factors for different levels of partial unitary operators are different;

evolving, at unique intervals of calculational steps, each level of partial unitary operators;

constructing quantum circuits based on each level of partial unitary operators; and with the constructed quantum circuits, applying each evolved level of partial unitary operators to a calculational state comprised of multiple qubits.

18. The method of claim 17, wherein for each matrix element, the corresponding the relative measure is a magnitude or an absolute value of matrix element, the method further comprising:

determining a greatest relative measure for off-diagonal matrix elements; and wherein each matrix element is assigned to a respective level of partial unitary operators based at least in part on the greatest relative measure.

* * * * *